United States Patent
Pasch et al.

(10) Patent No.: US 9,169,896 B2
(45) Date of Patent: Oct. 27, 2015

(54) APPARATUS AND METHOD FOR MAKING ENDLESS REINFORCED BELTS

(71) Applicant: The Gates Corporation, Denver, CO (US)

(72) Inventors: Lambert Pasch, Roetgen (DE); John Graeme Knox, Oxford, MI (US)

(73) Assignee: GATES CORPORATION, Denver, CO (US)

( * ) Notice: Subject to any disclaimer, the term of this patent is extended or adjusted under 35 U.S.C. 154(b) by 110 days.

(21) Appl. No.: 13/715,989

(22) Filed: Dec. 14, 2012

(65) Prior Publication Data

US 2013/0153123 A1   Jun. 20, 2013

Related U.S. Application Data

(60) Provisional application No. 61/570,814, filed on Dec. 14, 2011.

(51) Int. Cl.
*B29C 43/08*   (2006.01)
*B29C 43/46*   (2006.01)
(Continued)

(52) U.S. Cl.
CPC . *F16G 1/26* (2013.01); *B29C 43/08* (2013.01); *B29C 43/222* (2013.01); *B29C 43/28* (2013.01); *B29C 43/46* (2013.01); *B29C 43/48* (2013.01); *B29D 29/06* (2013.01); *B29D 29/08* (2013.01); *B29D 29/085* (2013.01); *B29C 2043/043* (2013.01); *B29C 2043/486* (2013.01);
(Continued)

(58) Field of Classification Search
CPC .... B29C 43/08; B29C 43/146; B29C 43/265; B29C 43/46; B29C 43/48; B29C 2043/043; B29C 2043/486; B29D 29/06; B29D 29/08; B29D 29/085; B29L 2029/00; B29L 2031/709; B29L 2031/7092; B29L 2031/7094
USPC ......................................... 156/425, 429, 432
See application file for complete search history.

(56) References Cited

U.S. PATENT DOCUMENTS 2,529,301 A * 11/1950 Lykken ........................... 425/29
2,628,505 A * 2/1953 Riel et al. ...................... 474/271
(Continued)

FOREIGN PATENT DOCUMENTS

DE        1214392 B     4/1966
DE        1270268 B     6/1968
(Continued)

OTHER PUBLICATIONS

Machine Translation of DE 19544885 A1. Dated Aug. 7, 2014.*
(Continued)

*Primary Examiner* — Michael Tolin
(74) *Attorney, Agent, or Firm* — Paul N. Dunlap, Esq.; Jeffrey A. Thurnau, Esq.

(57) ABSTRACT

A system, method and apparatus for making endless belts having a profile layer, a fully embedded, helically wound, cord layer, and a top layer. The apparatus has a rotatable mandrel with a profile complementary to the belt profile, two or one engagement rolls adjacent the mandrel to maintain forced, wrapped engagement of the profile layer on a portion thereof; a cord applicator which may include a heated blade that plows a groove in the profile layer into which the cord is laid and fused thereto. A laminator applies the top layer onto the reinforced carcass. A system of buffer rolls handles the loose portion of the profile layer or carcass guiding it.

36 Claims, 5 Drawing Sheets

(51) Int. Cl.

| | |
|---|---|
| *B29C 43/48* | (2006.01) |
| *B29D 29/06* | (2006.01) |
| *B29D 29/08* | (2006.01) |
| *F16G 1/26* | (2006.01) |
| *B29C 43/22* | (2006.01) |
| *B29C 43/28* | (2006.01) |
| *B29C 43/04* | (2006.01) |
| *B29L 29/00* | (2006.01) |
| *B29L 31/00* | (2006.01) |

(52) U.S. Cl.
CPC ........ *B29L2029/00* (2013.01); *B29L 2031/709* (2013.01); *B29L 2031/7092* (2013.01)

(56) References Cited

U.S. PATENT DOCUMENTS

| | | | |
|---|---|---|---|
| 3,078,206 | A | 2/1963 | Skura |
| 3,118,709 | A * | 1/1964 | Case .......................... 305/170 |
| 3,338,107 | A | 8/1967 | Kiekhaefer |
| 3,419,449 | A | 12/1968 | Di Valerio et al. |
| 3,556,892 | A | 1/1971 | Hilliard, Jr. |
| 3,799,824 | A * | 3/1974 | Arnao et al. ................. 156/139 |
| 3,880,558 | A | 4/1975 | Breher et al. |
| 3,973,894 | A | 8/1976 | Lindner et al. |
| 4,042,443 | A * | 8/1977 | Hoback et al. ............... 156/349 |
| 4,058,424 | A | 11/1977 | Breher |
| 4,083,838 | A | 4/1978 | Breher |
| 4,235,119 | A | 11/1980 | Wetzel |
| 4,251,306 | A | 2/1981 | Breher |
| 4,268,471 | A | 5/1981 | Breher |
| 4,361,456 | A | 11/1982 | Reschke |
| 4,563,323 | A | 1/1986 | Breher |
| 5,837,085 | A | 11/1998 | Chen et al. |
| 6,390,406 | B1 | 5/2002 | Wood |
| 6,966,763 | B2 * | 11/2005 | Goser et al. .................. 425/115 |
| 7,090,312 | B2 | 8/2006 | Soucy et al. |
| 8,033,619 | B2 | 10/2011 | Bellemare |
| 2009/0127739 | A1 | 5/2009 | Goser |

FOREIGN PATENT DOCUMENTS

| | | |
|---|---|---|
| DE | 1291473 B | 3/1969 |
| DE | 3206160 A1 | 9/1983 |
| DE | 3527640 A1 | 2/1987 |
| DE | 19544885 A1 | 5/1997 |
| DE | 102007017926 A1 | 10/2008 |
| DE | 202009003295 U1 | 6/2009 |
| EP | 1686286 A2 | 8/2006 |
| EP | 1710469 A2 | 10/2006 |
| GB | 886754 | 1/1962 |
| GB | 1286531 A | 8/1972 |
| JP | 2172718 A | 8/1972 |
| JP | 53-71181 A | 6/1978 |
| JP | 63162225 A | 7/1988 |
| JP | 6-31611 A | 2/1994 |
| JP | 2001-150566 A | 6/2001 |
| JP | 2001205714 A | 7/2001 |
| JP | 2002-166482 A * | 6/2002 |
| JP | 2002172708 A | 6/2002 |
| JP | 2008-291205 A | 12/2008 |
| JP | 2010-023411 A | 2/2010 |

OTHER PUBLICATIONS

John Graeme Knox, "The Engineering Development of Power Transmission Belts Based on Thermoplastic Polyurethane Elastomers," Ph.D. Thesis, Univ. of Ulster, Ch. 5 & 6, Mar. 2003.

Japanese Patent Office, Japanese Office Action application No. 2014-547527, dated Jul. 7, 2015.

* cited by examiner

APPARATUS AND METHOD FOR MAKING ENDLESS REINFORCED BELTS

BACKGROUND OF THE INVENTION

1. Field of the Invention

This invention relates generally to a system for making endless belts reinforced with a spiraled tensile cord layer, more particularly a system for making toothed belts of practically any length on the same apparatus and tooling and specifically endless belts with no cord exposed to the outside surfaces of the belt.

2. Description of the Prior Art

Endless belts are typically made of elastomers having tension members embedded in the circumferential direction. The elastomer may be vulcanized rubber, thermoplastic elastomer, or castable elastomers. There are several methods typically used for manufacturing endless belts of thermoplastic elastomers and of rubber.

A first method uses a cylindrical mandrel of a defined diameter to produce a specific endless belt length corresponding to that diameter. Such a mandrel may include the desired surface patterns or profile on its surface to produce for example a toothed belt profile. An example as applied to thermoplastic belts is disclosed in GB 886,754 to Hutzenlaub. These mandrels are expensive and this method can only produce one specific belt length on a given mandrel. The longer the belt, the bigger and more expensive the mandrel. Belt length is therefore limited for practical purposes. Note that belt "length" for an endless belt refers to the circumference of the belt. This method is also used for making endless rubber belts, as disclosed for example in U.S. Pat. No. 3,078,206, to Skura. This kind of method is also common for castable elastomer belts.

A second method particularly adapted to making endless belts from open-ended belts is to produce a continuous length of reinforced belt material which is subsequently cut to the desired length and the two ends joined together to make an endless belt. Various splicing or joining methods are in use, but the splice is always weaker than if the tensile cord was continuous and helically wound. Examples of the continuous method for making open-ended thermoplastic belts are disclosed in U.S. Pat. Nos. 3,880,558 and 4,251,306 to Breher, et al., in which a rotatable molding wheel is supplied with a molding band (usually of flexible steel) wrapping around about half of the circumference of the molding wheel to form a rotating molding chamber into which cords are fed along with extruded belt material. Likewise, a continuous length of rubber belt can be made by advancing the belt elements between a heated grooved cylindrical mold and a pressure band. In a secondary process, the ends of the open-ended belt having the desired belt length are joined together. Such a splice causes dimensional irregularities (or pitch error) and provides a weak point in the belt, typically reducing the load capability and lifetime of the belt by about 50% vs. a non-spliced endless belt.

A third method uses two cylindrical mandrels which can be moved relative to each other to adjust for the desired belt length. Typically, the method includes helically winding the tension members around the two mandrels, and then extruding or casting and/or curing an elastomeric material to provide the elastic matrix, embedding the tension member and forming the profile of the belt. Typically, one of the mandrels is a molding wheel with a pressure band forming a molding chamber into which belt material is injected or extruded as described in the second method above. This method has some disadvantages. The equipment is expensive and space consuming, especially for longer belt lengths, and the operating efficiency and output rate is less than desirable. The belt length is limited on the low end by the minimum distance between the two mandrels. Belt length is limited on the high end by the maximum distance technically feasible to control the accuracy of the center distance of the belt. Center distance variation can also be a problem as a result of the gradually increasing total tension between the two mandrels as the cord is wound on under tension. Mold flights are typically used to support the tension members, resulting in cord exposure in the finished thermoplastic belt. Rubber belts according to this method could be cured in a series of steps in which the belt materials are progressively advanced between flat molding plates.

In a fourth method, an open-ended strip of belt is helically wrapped around two mandrels spaced to achieve a desired belt length, and the edge seams are fused or glued together to form an endless belt of desired belt width. This method permits belts of different length by changing the distance between the two mandrels. An example is disclosed in U.S. Pat. No. 4,058,424 to Breher. This method also has some disadvantages. The equipment is expensive and space consuming, and the operating efficiency and output rate is less than desirable. In addition, depending on the width of the strips, more cords are cut and exposed on the belts edges, reducing the effective strength of the belt, slight differences in the tension of the strips causes pitch variation and sideways tracking of the belt, resulting in reduced belt life and noise. The belt length is limited on the low end by the minimum distance between the two mandrels. Belt length is limited on the high end by the maximum distance technically feasible to control the accuracy of the center distance of the belt. Further reliable joining of the strips is difficult and represents a potential failure risk, causing the belt to disintegrate during higher load conditions, particularly by cutting the ends of the strip on the belt edge against a pulley flange and then peeling or unraveling the belt.

Mention is made of the applicants' co-pending U.S. application Ser. No. 13/715,977, titled "Method of Making Open-Ended Thermoplastic Belting," filed on the same day, claiming the benefit of provisional application 61/570,815 filed on Dec. 14, 2011, the entire contents of which are hereby incorporated herein by reference.

What is needed is a more efficient, accurate method of making endless reinforced belts without need for a splice, no exposed cord, and using one tool to make different belt lengths.

SUMMARY

The present invention is directed to systems and methods which provide endless reinforced belts without a splice of the tension members, or provides a method and apparatus for manufacture of endless belts made of a elastomeric matrix in which tension members are embedded in the circumferential direction, whereby only one mandrel is needed to produce belts of different length and width. Such belts can be toothed belts, flat belts, multi-v-ribbed belts, conveyor belts and similar products. The elastomeric matrix can be a thermoplastic polyurethane or any other suitable thermoplastic elastomer, or the method can be adapted for vulcanizing rubber belts. The tension members typically consist of twisted fibers or filaments of steel, glass, aramid, carbon, polyester, polyamide, basalt, or other suitable materials or hybrids thereof.

The invention is directed to a belt-making system including three belt materials: an elastomeric profile layer, a tensile cord, and an elastomeric top layer. The system includes a belt-making apparatus having: a rotatable cylindrical mandrel having a profile complementary to the belt's profile and a circumference less than that of the profile layer so that only a portion of the profile layer can be engaged with the mandrel at any time; one or more engaging rollers positioned adjacent the mandrel and/or a tensioning system to maintain wrapped engagement of a wrap portion of the profile layer material on a wrap or engagement portion of the mandrel during rotation of the mandrel; a cord applicator to helically apply and attach continuous tensile cord onto the profile layer within the engaged portion; and a laminator to apply the top layer onto the thus reinforced profile layer, sandwiching or embedding the cord between the two layers.

The cord applicator may include a heated profile blade to melt a groove in the profile layer and a cord laying device to press the cord into the surface of the groove, thus fusing the cord to the profile layer while the profile layer is engaged with the mandrel. The cord applicator may be movably mounted over the wrap portion for transverse movement in the axial direction with respect to the mandrel axis and for positioning the blade a predetermined distance from the mandrel surface to control the cord position against the profile surface for exact pitch-line control.

The laminator may include a pressure roll positionable adjacent the wrap portion and defining a nip between the mandrel and the pressure roll and a heating system to melt the surface of the top layer and/or the profile layer materials prior to being pressed together to fuse the materials together, such that simultaneously a bonding between the thermoplastic elastomeric materials and the tension member is realized. In other embodiments, the laminator may extrude a thermoplastic resin or TPE, or cast a liquid, curable resin for the top layer.

In various embodiments, the apparatus may also have one or more guide rollers representing a buffer section remote from the mandrel in which the loose portion or non-wrapped portion of the profile layer, carcass, and belt may be trained. The tension of the profile layer in the buffer section (i.e., in the non-wrapped portion) prior to tension member embedding may be set by moving the position of one of the buffer rollers such that the unreinforced profile material sleeve meshes perfectly with the profile of the mandrel, such tension is relatively low in comparison to the strength of the final belt with reinforcements This low tension allows a rather simple buffer structure as it does not have to carry high loads and has no or very limited influence on the final belt pitch.

The cord laying guide may be designed for single, dual or multiple cord laying with the profile blade adapted to form the corresponding number of grooves for simultaneously laying multiple cords onto the profile layer. To further increase productivity, there may also be one or more additional cord laying guides and associated heated blades for simultaneously laying cord on two or more sections of the profile material.

The belt may be a toothed belt, with the belt profile having a plurality of teeth, and the mandrel having grooves adapted to mate tightly with the teeth controlling the exact pitch of the profile material during cord-embedding. The apparatus may also have a tooth counter for determining the number of teeth prior to joining the non-reinforced profile material.

The invention is also directed to a method of making an endless toothed belt with a layer of helically spiraled cord between a profile layer and a top layer of thermoplastic material. The method includes a number of steps, beginning with providing an endless profile layer of a first elastomeric material, which may conveniently be made offline in a separate process. The endless profile layer is wrapped around the wrap portion of the mandrel using either the buffer tension force or one or two or more clamping or engaging rolls to maintain engagement of the profile material with the mandrel during rotation of the mandrel. The mandrel is then rotated so the endless profile material passes over the wrap portion a plurality of times. During rotation a groove is melted or formed in the rotating profile material and the cord is applied into the molten surface of the groove on the profile material. This process of rotating, groove-forming, melting and applying cord is continued to form a reinforced "carcass" having a spiraled, tensile cord layer firmly attached thereon. Finally, a top layer of a second elastomeric material is laminated or extruded onto the reinforced carcass to form a belt "sleeve." Laminating includes applying heat to the elastomeric materials prior to or while being pressed together by the pressure roll located in the wrapped portion, thus fusing together the top layer and the carcass and simultaneously bonding the tension member to the elastomeric materials.

In various embodiments, the method may include training the loose portion of the endless profile, carcass, and belt over at least one buffer roll, or over a plurality of buffer rolls, remote from the mandrel. The buffer rolls may be adjustable to ensure that the total length of the profile material not engaged with the mandrel is guided without interference during rotation. Approximately no tension is needed on the profile layer, carcass or belt in the buffer section. These buffer rolls are also called guide rolls or rollers herein.

The method may include forming the profile material in a separate continuous operation; cutting a predetermined length of so-formed continuous profile material and joining the ends to form the endless profile layer. For toothed belt profiles, the join may be a butt join and may be advantageously located in the land area between two belt teeth or alternately in the tooth. For toothed belts, the mandrel has at least one groove less than the number of teeth in the belt that is made by the method. The maximum length of belt that can be made is practically limited only by the capacity of the buffer section.

According to embodiments of the invention, a belt having no exposed edge cord may be produced, of practically any desired length on a single mandrel and apparatus. The belt also has no exposed portions of cord in the land areas because no mold flights are needed to support the cord on the mandrel. A number of belts may be produced from a single sleeve, all without exposed edge cord, by removing the cords prior to laminating the top layer to the reinforced carcass, in the area were the belts are cut from the sleeve.

Suitable control of belt pitch and pitch line differential (PLD) is achieved by controlling the cord tension during cord laying, the depth position of the heated knife or plow and the melting conditions of the cord groove. The mandrel may have an adjustable drive allowing controlled ramp-up and production speeds for cord application and for lamination. For cord application the mandrel rotation is linked via an adjustable gear, preferably electronic gear to the movable cord lay slide drive. This allows setting and control of the number of cords per inch embedded in the carcass, considering the circumference of the mandrel vs. the circumference of the profile material.

The process may be automated, from counting the teeth of the desired belt, making the endless profile layer by joining the profile material from a continuous profile material, laying cord in the described manner and laminating the top layer from a continuous roll. One or more additional operations such as grinding, belt cutting, and printing processes may also be included on the same equipment or on a separate machine to make the final belt in one or multiple machines.

The laminator may include a pressure band trained around a number of rollers to provide provides more and longer pressurizing and thus higher lamination speed. The pressure band laminator could also be used with metering device such as an extruder or gear pump to apply the top layer of thermoplastic or thermoset, curable resins. The pressure band in conjunction with suitable a heater could also enable application and curing of vulcanizable rubber materials for the top layer and/or profile layer.

The lamination material could be extruded onto the cord and applied spirally during the cord winding. Alternately, the cord could be glued onto the profile layer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art, that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

The invention provides a method and apparatus for manufacture of endless belts made of an elastomeric matrix in which tension members are embedded in circumferential direction, whereby one mandrel or mold is used to produce belts of different length and width. Such belts can be toothed belts, flat belts, multi-v-ribbed belts, conveyor belts and similar products. The process is particularly useful for making toothed belts which require precise control of the tooth spacing or "pitch." The elastomeric matrix can be a thermoplastic polyurethane (TPU), thermoplastic vulcanizate (TPV), or any other suitable thermoplastic elastomer (TPE in general). The process can also be adapted for thermoset resins or for a vulcanized rubber matrix. The matrix materials may include any number of desirable ingredients, including for example, anti-oxidants, anti-ozonants, UV stabilizers, anti-microbial additives, process aids, softeners, fillers, friction modifiers, foamers, and the like.

The tension members typically consist of cords, yarns, fibers or filaments of steel, glass, aramid, carbon, polyester, polyamide, basalt, or other suitable materials or hybrids thereof. A yarn is a bundle of fibers or filaments and may be twisted or cabled. A cord is a twisted, braided, or cabled yarn or bundle of yarns and may be treated for adhesion or handling purposes. The terms wire and cable are often used in connection with metal cords or metal tension members. Herein, "cord" or "tensile cord" will be used to refer to all types of tension members. Fabric layers or other non-typical types of tensile reinforcements may also be used in conjunction with yarn bundles or instead of more typical cords, such as tire cord, open weave scrims, woven fabrics, or nonwoven fabrics, or the like.

Figure 1:
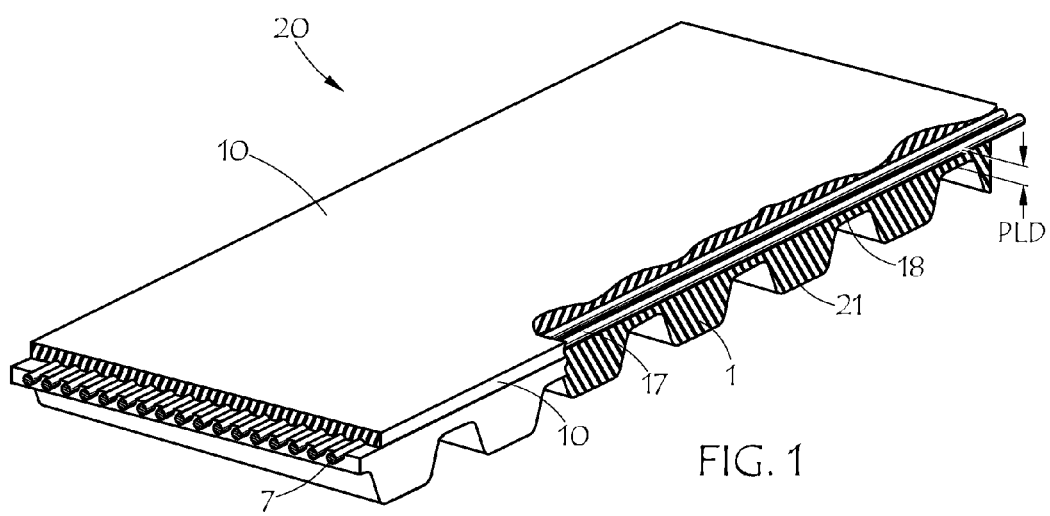
FIG. 1 is a partially fragmented perspective view of a belt made according to an embodiment of the invention.

Toothed belt 20 in FIG. 1, according to an embodiment of the invention, includes three primary components: profile layer 1, tension member 7, and top layer 10. One or both surfaces could optionally include a woven or non-woven fabric, plastic film, or other surface treatment. The profile layer and top layer could be the same material or could be two different elastomeric materials.

Profile layer 1, may be made of continuous extruded TPE or TPU having teeth, or other desired belt profile, on one side and a flat surface on the opposite side. The profile layer may be formed by known methods of extrusion forming or molding, such as the methods disclosed in U.S. Pat. No. 4,251,306, which utilize a molding wheel and molding band adjacent or wrapping around about half of the circumference of the molding wheel to form a rotating profile molding chamber into which the profile material is extruded for continuous shaping. Alternately, the profile layer could be a rubber composition, which could be formed in a similar way and partially vulcanized. It should be understood that such forming processes are implemented without any embedded cord for the purposes of the present invention. Thus, the present profile layer may be formed much more quickly and efficiently than prior methods wherein a belt is formed with cord embedded therein. Moreover, the belt profile formed on the profile layer may be formed without the usual indentations or defects because flights or noses are not required for cord support. If desired the profile layer may include a textile layer or a film on the tooth surface for wear resistance, noise improvement or other purpose. Suitable textiles include woven, knitted and nonwoven fabrics, for example. The final thickness of the profile layer is selected to allow full or partial embedding of the tension member at a predetermined pitch line differential ("PLD"). PLD is a measure of the thickness of the belt under the cord line, and is defined as the distance from the belt surface in the land region to the cord center line, as indicated in FIG. 1. The land region 18 is the thin section of the belt located between any two adjacent teeth 21.

Tension member 7 is typically made of continuous filaments twisted into a cord and typically may have an adhesive coating to bond with the elastomeric matrix material. Tension member 7 is spiraled in the belt. Two or more different cords may be spiraled in the belt side by side simultaneously. For example, one, or two or more cords of equal or opposite twist (i.e., S and Z twist) may be used as the tension member. The tension member may be exposed at the side of the belt, or preferably, the tension member is fully embedded in the elastomer matrix without exposure at one or both sides. Any suitable type of cord may be used. An adhesive coating may be applied to the cord prior to cord laying in a separate operation or during cord laying in an integrated coating operation before the cord contacts the elastomeric matrix material.

Tension member 7 is applied and fused to profile layer 1 in a continuous, helical winding process that will be described in more detail below. The resulting reinforced profile layer is called the "carcass" or "reinforced carcass" herein. It requires the addition of top layer 10 to make completed belt 20. It should be noted that the application of the cord to the profile layer and the lamination of the top layer to the carcass are carried out on an open mandrel without use of a molding band.

Top layer 10 is typically made of continuous extruded TPE or TPU or rubber of either the same material as the profile layer or a different material or different formulation. For example, the profile layer may be made of a relatively stiffer material for carrying high tooth loads, while the top layer may be of a relatively softer material for higher flexibility, different coefficient of friction and/or for reduced noise and/or for reduced cost. The thickness of the top layer may be selected to complete the embedding of the tensile member and have a desired amount of additional material over the cord in the belt. The top layer preferably may have about the same width as the profile layer. The processing of the top layer may be by conventional extrusion through a suitable die for a smooth top layer. If some secondary profile or texture is desired on the back side of the belt, then a process such as used for the profile material may instead be used to make the top layer. As for the profile material, a textile cover may be applied to the top layer during formation if such a cover is desired for the finished belt to modify appearance, or to reduce friction and/or noise. A textile layer could be applied to the carcass to be embedded between the carcass and the top layer.

The lamination process is typically made using heat input to the laminating surfaces at a lamination speed such that shortly before the nip-line between the pressure roll and the mandrel, only the contact surfaces of the reinforced carcass and the top layer are molten or tacky, while the bodies of these materials still remain solid and keep their shape. Temperature control of the pressure roll and the profile mandrel is also important in combination with the rotation speed of the mandrel to insure sufficient heat on all three materials (lamination material, cord and profile material) for a good bonding and adhesion result. While going through the nip, the materials are pressed firmly together to avoid air entrapment and to provide immediate bonding of all three materials (cord, top layer, and profile layer). The heat input to the material surfaces entering the laminator nip may be provided by hot air blower providing heat and airflow, or by infrared radiation, or by a hot knife or laser, or by combinations of heating means. In other embodiments, a pressure band which wraps around a portion of the mandrel may be used to provide a longer time period for lamination than the nip described above.

Figure 2:
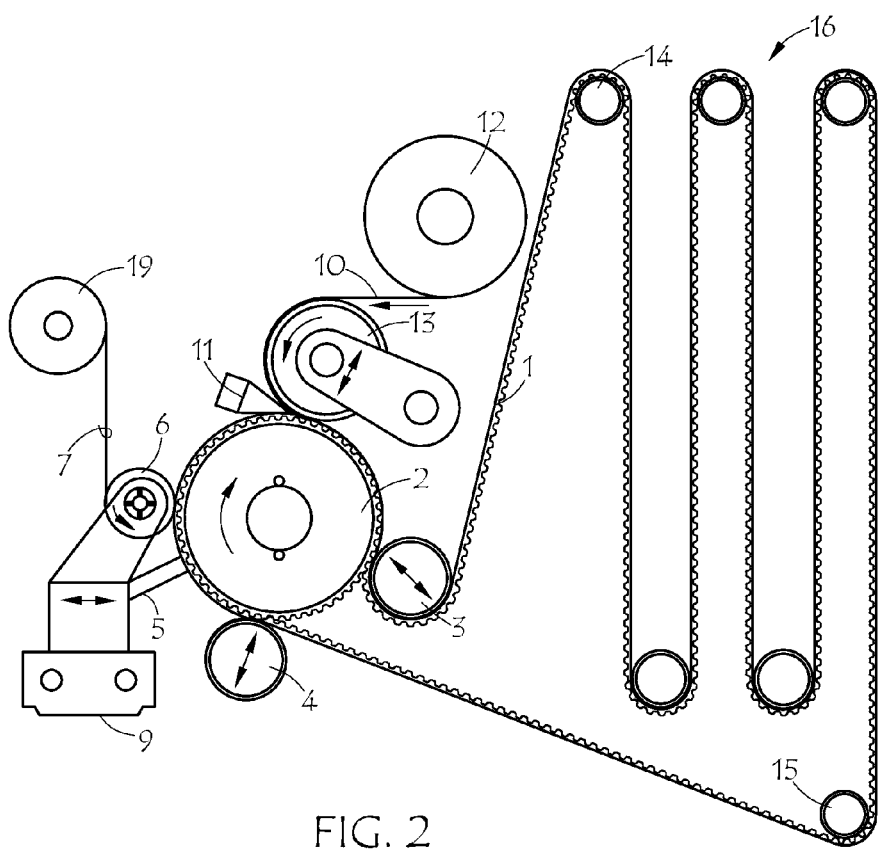
FIG. 2 is a schematic representation of a system according to an embodiment of the invention.

According to embodiments of the invention, the manufacturing process includes the following steps using the apparatus as shown in FIG. 2.

The profile material having the desired belt profile on one side is provided in the desired length and width. The profile material may thus be cut from a continuous extruded strip and joined by known methods to form endless profile material layer 1 of the desired length, and in the case of a toothed belt, with the desired number of teeth. Fusion of the ends may be, as non-limiting examples, by thermal fusion by heat treatment or ultrasonic welding, direct adhesion, or thin film or adhesive tape, or combinations thereof. By "belt profile" is meant a belt surface configuration adapted to engage a pulley or sprocket in driving relation thereof in a belt drive system. In a friction driven belt drive system, for example, the belt profile may be flat, or V-shaped, or multi-v-ribbed, while in a synchronous or positive drive system, the belt profile may be a series of evenly spaced transverse teeth or angled or helical teeth. The present invention is particularly advantageous for making toothed belts for positive drive systems, which require close tolerances on the tooth shape and pitch and the belt pitch length for proper meshing with toothed pulleys. For toothed profile material, the ends are preferably joined in the land area to better allow stretching or compressing during engagement with the mandrel for cord laying, thus avoiding pitch error in the region of the join. However, the join could be in the tooth region if a stronger join is needed than possible with a land join. Of course, other joining methods such as finger joints, saw tooth joints, or the like could be used. Thus, an endless profile layer is provided.

The endless profile layer 1 is then installed onto the manufacturing apparatus as shown in FIG. 2. Thus, profile layer 1 is wrapped around a portion of mandrel 2, engaging the belt profile of the profile layer with the complementary mold profile of the mandrel. Two smooth engaging rollers 3 and 4 hold the profile layer in engagement with the mold profile during mandrel rotation. These rollers are "positionable," meaning they can be moved to a desired position to accommodate different material thicknesses, different pressure requirements, and the like. They are "adjacent" the mandrel, meaning in close proximity to, near or even touching the mandrel or the belt materials being engaged on the mandrel, thus rotating in synchronization together. The arrows show the direction of rotation of mandrel 2, and the direction of other rollers and materials follow. Double arrows show the direction of movement for engaging and disengaging various positionable rollers. The portion of the mandrel bounded by the two engagement rolls 3 and 4 and on which the profile layer is wrapped is called the "wrap portion" or "engagement portion" of the mandrel herein. The portion of the profile layer, carcass or belt wrapped on the mandrel is likewise the wrap portion or engagement portion thereof. In FIG. 2, the wrap portion is shown extending from about the seven o'clock position, the location of guide roll 4, to about the four o'clock position, the position of guide roll 3, on mandrel 2. This position is illustrated for description purpose only and may be altered without leaving the scope of this invention. The amount of wrap is not particularly limited but may advantageously be in the range from about 45 to about 315°, or from about 90° to about 300°, or from about 180° to about 270°, or about 270° around the mandrel circumference. The more wrap, generally the more accurate the pitch control and/or the faster the apparatus can be operated. While the orientation of the mandrel axis is shown as horizontal, it could be vertical or some other desired orientation.

In the inventive system, the mandrel is smaller in circumference than the belt being built thereon. Thus, there is always a wrapped portion of the belt or profile layer and a free portion that is not engaged on or in contact with the mandrel. For making toothed belts, the mandrel must be at least one tooth pitch smaller in circumference than the belt being made. In other words the mandrel has at least one groove less than the number of teeth in the belt profile.

The loose or free portion of the profile layer (or eventually the belt), i.e., the portion not wrapped or engaged on mandrel 2, may be trained about one or more additional buffer rollers, such as roller 14 and/or roller 15 in FIG. 2. For short belts (i.e. not much longer than the mandrel circumference) no such buffer roll is used or needed. Up to a certain length of the belt, one adjustable buffer roll may be used allowing to adjust for each incremental length, the length range is further extendable by a plurality of buffer rolls to make endless belts of up to 100 meters length or more. A typical buffer arrangement is illustrated in FIG. 2 for making very long endless belts. Buffer section 16, having a plurality of buffer rollers, may advantageously be utilized to guide the loose portion of the profile layer, reinforced carcass, and belt during manufacturing. The upper buffer rollers may in addition be moveable upwardly to enlarge the belt length range without extending the required floor space. The buffer section thus enables fast and convenient loading and unloading and allows rapid rotation of the mandrel without the loose portion hanging up on itself or entangling on other parts of the equipment. The buffer rollers and/or buffer section also enable endless belts of practically any size desired to be manufactured in a very compact area using a single building mandrel 2 regardless of belt length or width. As will be discussed below, the belt loose portion in the buffer section preferably is not under any significant tension beyond the minimal tension needed to eliminate excessive slack in the respective belt span or spans and the tension needed to ensure the profile material engages with the mandrel profile at guide roll 4 and disengages from the mandrel as it exits at guide roll 3. Thus, some minimal tensioning is preferred to ensure proper training of the belt in the buffer arrangement, support the weight of the belt itself, and overcome any rotational resistance of guide rollers, friction etc. Such minimal tensioning is herein referred to as "approximately no tension" or "without tension." This is in contrast to prior art methods, particularly the method involving two spaced apart mandrels, where the cord tension at the point of cord lay is maintained throughout the entire belt build during building, often resulting in extremely high total forces on the mandrels and their support structures. Such prior art methods require massive frames and rigid structures to maintain the belt length and pitch. The rollers and mandrel in this apparatus may be mounted on a single frame on one side of the apparatus so that the other end of the rollers and/or mandrel is open for easy installation and removal of endless profile layers and belts. Alternately, both ends of the roll may be mounted on frames, but with the frame on one side easily openable for belt installation and removal.

Figure 5:
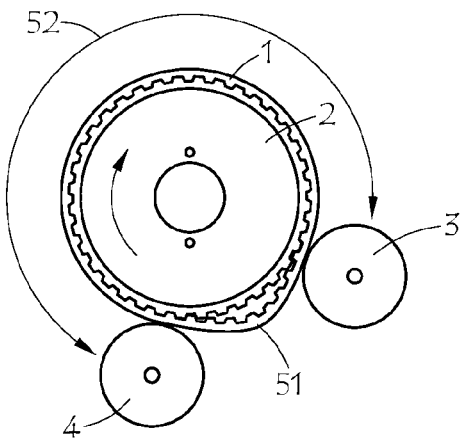
FIG. 5 is a schematic representation of a portion of a system according to another embodiment of the invention.
Figure 6:
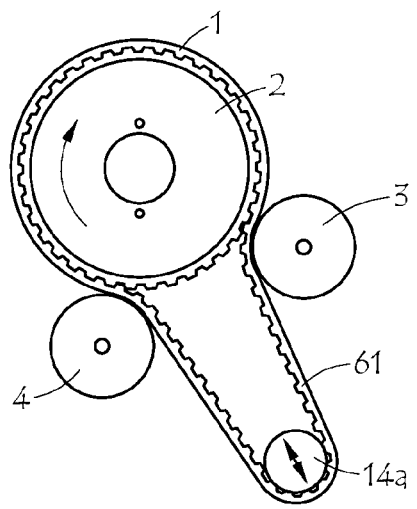
FIG. 6 is a schematic representation of a portion of a system according to another embodiment of the invention.

FIGS. 5-8 illustrate a number of alternative arrangements for the engaging rolls and buffer section, applicable to making belts of different lengths. FIG. 5 shows an arrangement of the apparatus suitable for making belts that are too short to use any buffer rolls at all, down to a minimum belt length that is one tooth longer than the number of teeth on the mandrel. Thus, in FIG. 5, profile layer 1 is shown wrapped on mandrel 2 over engagement portion 52, facilitated by two guide rolls 3 and 4. Unengaged or free portion 51 of the belt is self-supported, i.e., not trained around any other pulleys or rollers. This arrangement may be suitable for somewhat longer belts than illustrated, but only as long as free portion 51 cannot fold onto itself causing interference between its teeth. For belts of that length or longer, the arrangement of FIG. 6 is a suitable alternative. In FIG. 6, profile layer 1 is engaged onto mandrel 2 by two guide rolls 3 and 4, and free portion 61 is trained around a single buffer roll 14a, which is shown as capable of adjustment to accommodate making belts of various lengths. The primary purpose of roll 14a is to prevent tangling or interference of the free portion of the belt with itself. Roll 14a need not apply any more tension than required to control the free portion, i.e., approximately no tension.

Figure 7:
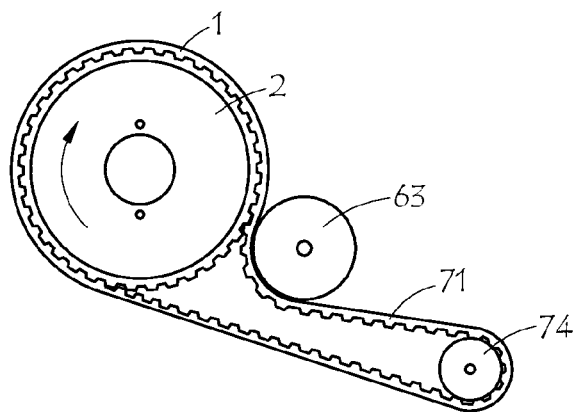
FIG. 7 is a schematic representation of a portion of a system according to another embodiment of the invention.

FIG. 7 shows an alternative arrangement wherein only one engaging roll 63 adjacent to mandrel 2 is needed to maintain engagement of profile layer 1 on mandrel 2. Again, free portion 71 is trained over single buffer roll 74.

Figure 8:
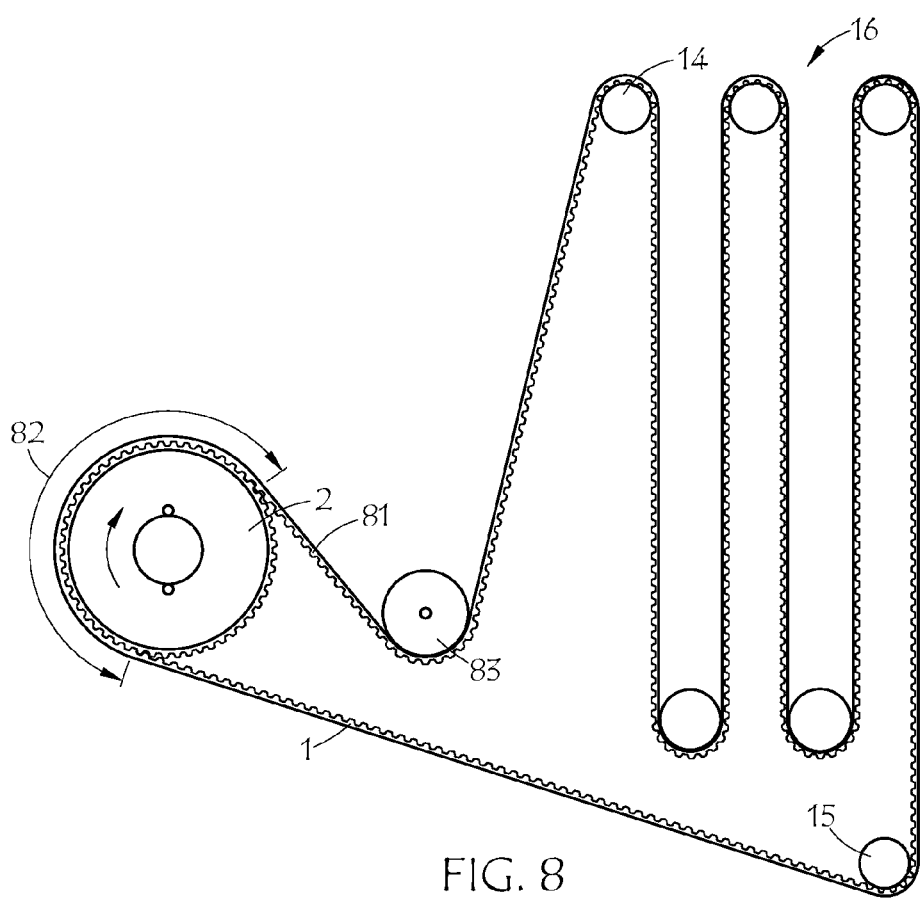
FIG. 8 is a schematic representation of a portion of a system according to another embodiment of the invention.

FIG. 8 shows an alternative arrangement wherein no engaging or guide rolls are used adjacent mandrel 2, but a tensioning system is used instead. Wrap portion 82 of profile layer 1 is determined by the wrap angle created by the tension roll 83 and the last buffer roll 15. Additional buffer rolls 14 make up buffer section 16, so that almost any length of belt can be made as in the embodiment described earlier and shown in FIG. 2. However, in the special arrangement of FIG. 8, some tension is needed at tension roll 83 and/or the last guide roll 15 to maintain engagement and disengagement of the profile layer on the mandrel. However, the tension required to engage the profile layer is still much less than the tension applied in prior art methods of cord winding on two mandrels. Moreover, the tension need not increase as the cord is wound onto the profile layer.

After the profile layer is installed on the mandrel and buffer rolls, the mandrel is rotated at a predefined speed for cord laying. The wrapped portion of the profile layer is always forcibly engaged in the wrap portion of the mandrel during rotation. During rotation of the mandrel, the heated profile blade 5 is positioned against the back side of the profile material to melt a groove into the material at a precise depth, width and temperature, and the tension member or cord 7 is provided by cord let off and tension control apparatus 19 to supply cord to the guide roll 6, which places the cord into the groove at the desired depth to control the pitch line of the belt. The groove width and depth may be about the same as the cord diameter. The knife heating may be controlled to allow variable speed cord laying, e.g. to accommodate initial ramp-up or other speed changes. The molten material in the groove of the profile material rapidly cools either before or as the cord is embedded into it. The cord is bonded or fused to the profile material before the wrapped portion exits the engagement portion of the mandrel. The cord is thus partially embedded and fused to the profile layer and is able to freeze the pitch of the teeth very accurately while the resulting reinforced carcass is still engaged on the mandrel. The pitch is then accurately retained even when the carcass is disengaged from the mandrel because of the typically very high tensile modulus of the cord. The precise depth of the groove and the precise placement of the cord results in a precisely controlled pitch line and PLD as is desirable particularly for toothed belts. An important advantage of the present method is that precise cord depth can be maintained in profile materials that have variations in thickness or waviness. The heated knife can plow a groove at a precise distance form the mandrel surface even through wavy material. Thus, a precise and uniform PLD is produced. Waviness can be caused for example by differential shrinkage of profile material during its forming process.

During helical cord laying, the heated blade 5 and cord guide roll 6 are movable, in concert, from one side of the profile layer to the other by slide 9. The movement of slide 9 is synchronized with the mandrel rotation to provide the desired cord spacing. During cord laying the cord is also tensioned to a predefined level to achieve the correct length and pitch of the belt. Cord feed apparatus 19 may thus include one or more spools or reels, associated tensioning or braking apparatus and the like, as desired. Also, cord temperature may be increased or controlled in the cord lay zone to remove moisture, to adjust or stabilize the melting and fusing effect, and/or to minimize the effect of environmental conditions such as humidity or temperature.

It should be understood that by fusing the cord to make the carcass at the desired PLD and tension in the forcibly engaged portion of the mandrel, the portion of the reinforced carcass trained through buffer section 16 does not require significant tension to maintain cord spacing, cord lay belt pitch, or integrity of the carcass, and neither does cord winding result in increasing tension forces as more cord is wound on. This principle eliminates the need to hold the carcass under a given tension (or increasing tension) while it is disengaged from the mandrel and makes the process simple and very effective in productivity as well as in dimensional accuracy. Thus, a number of the problems described with prior art methods are eliminated. The problem of a pitch error or weakness in the join section of the above described known method two is eliminated by the invention. Reliance on building the belt on a single mandrel for pitch (tooth spacing) control represents a distinct advantage over prior methods, allowing significantly lower cost and more compact equipment design, providing higher material-, labor- and energy-efficiency as well as more accurate product dimensions, particularly pitch control on long, endless, toothed belts. Some amount of tensioning may of course be utilized advantageously to insure proper training of the belt in the buffer section as discussed previously.

Figure 9:
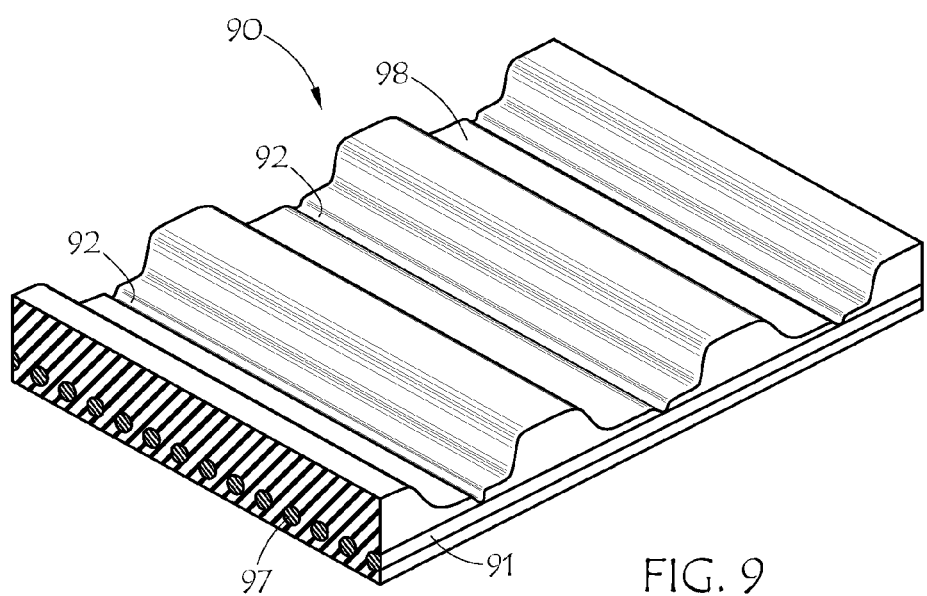
FIG. 9 is a partially fragmented perspective view of a belt made according to the prior art.

It should also be understood that according to the present method, the cord is fully supported by the profile layer. This also represents a distinct advantage over prior methods which required small flights or protrusions or noses on each tooth of the mandrel to lift the cord off of the mandrel surface for a desired PLD. FIG. 9 shows belt 90 made by such a prior art method wherein cord 97 is supported by mold flights. Such flights resulted in cord bends which could weaken the cord or lead to early fatigue failure. Such flights also resulted in cord exposure at the flight impressions 92 in the land area 98 in the finished belt 90, which could also be points of contamination and/or corrosion causing early belt failure. The elimination of flights also allows the same apparatus to produce belts with a variety of cord material types, cord diameters, and/or PLD. Conventional methods using flights normally required new mold tooling to accommodate a change in the cord thickness. Also the use of certain tension member materials like glass fiber was not possible because the flights would damage such material during manufacture and operation of the belts. The invention allows the use of all types of tension members on the same tooling by adjusting the position of the heated groove profiling device to control PLD. "Tooling" is used to refer to the mandrel, i.e., a specialized mold limited (unless substantially altered) to making belts having the specific profile of the tool. The tooling of the present invention is much more versatile than in prior art methods.

Figure 3:
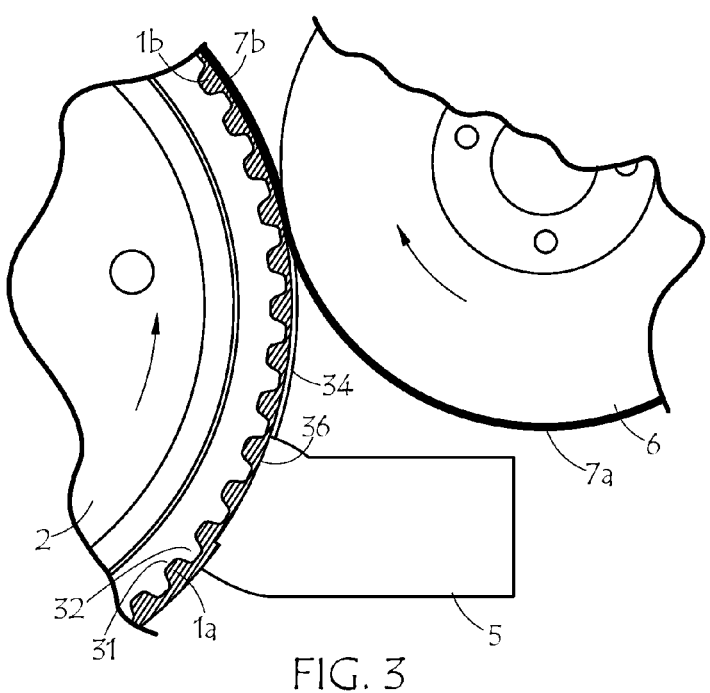
FIG. 3 is an enlarged view of a portion of the system of FIG. 2.

Cord laying is further illustrated in FIG. 3. In FIG. 3, the profile material 1a has teeth firmly or tightly engaged in grooves 31 between teeth 32 of mandrel 2. The teeth of the profile material 1a should be snugly engaged in grooves 31 of mandrel 2. The arrow shows the direction of rotation of mandrel 2. The heated blade 5 has a profiled edge 36 which forms groove 34 on the back side of the profile layer 1a. The heated blade preferably acts like a plow as it forms a groove of molten material. Cord guide roll 6 supplies cord 7a, guides and presses it into groove 34 before the groove material resolidifies. The distance between blade and cord guide roll, cord lay speed, and temperatures should be controlled such that the profile material surface stays molten or tacky until the cord is embedded. The result is reinforced carcass 1b with cord 7b fused thereon. In an alternate embodiment, the groove material may instead solidify before the cord contacts the groove surface. In this case, the cord alone may supply the heat for fusing to the profile material, or an adhesive or tacky material may be employed to fuse the cord to the profile material to form the carcass.

It may also be noted that some prior methods required heating of the cord to fuse it to the thermoplastic. Such methods generally were limited to metal cords and utilized electrical heating. The present invention normally does not require such heating of the cord and can apply to all kinds of tensile cord materials. However, heating of the cord may allow an increase in cord lay speed and can easily be provided by heating the cord before it enters the guide roll and/or heating the guide roll. Heating may be achieved electrically or with external heaters of any suitable type. The cord may be embedded approximately 30% to 100%, or 50% to 90% or about two thirds of its thickness or in the range from one-half to one cord diameter, but this may advantageously be adjusted, depending on the material of the cord and the profile layer and cord diameter, to give a desired PLD.

In other embodiments, several winding heads can be used to apply multiple cords. For example, S and Z twisted cords can be laid side by side helically. Alternately, or in addition, multiple heads can be used to make multiple belts within a single belt sleeve, leaving cordless gaps between belts so that no edge cord shows when the belts are cut apart at the gaps. Alternately, cord can be wound on, jumping gaps without interrupting the winding, and then removing the cord in the gaps before laminating, to again result in no edge cord after cutting the sleeve at the gaps. In contrast, prior art methods result in edge cord exposure, as illustrated in FIG. 9 by edge cord 91.

Some alternative groove-forming methods can be mentioned. Instead of the heated knife, laser cutting or profile grinding could be applied to form the groove in which to lay the cord. Alternately, mechanical knife cutting could be used in combination with laser heating, or infrared heating, or hot air, or the like. The groove could be formed directly in front of the cord roller as discussed above, or the groove could be formed one or more turns of the mandrel prior to cord laying. The groove could even be formed in a separate operation over the whole sleeve prior to cord laying. In the latter cases, if the groove is not formed directly in front of the cord roll, the groove surface could be heated to melt it just before the cord is laid into the groove to achieve the required fusion of the cord to the profile material, or the cord could be heated, or an adhesive material could be used, or combinations thereof.

Another method to apply the cord and provide lamination in one operation is proposed by using a mini-extruder which is installed on slide 9 and which has a die which is designed for coating cord (one or two cords) to guide the cord through and apply the elastomeric material around it sufficient in quantity and shape to provide the cord lay and the lamination material for this section at the same time. Then the lamination material is applied spirally along with the cord laying. The extrusion part of this method is similar to a cable pultrusion process, which provides a further improvement to speed and cord embedding. This method may be applied in combination with the groove cutting blade or without it.

After completion of the cord laying operation top layer material 10 is applied by setting the mandrel rotation to the desired laminating speed and moving laminating pressure roll 13 towards mandrel 2 such that top layer 10 and reinforced carcass form a nip where the two materials, partially molten by lamination heater 11, are pressed and joined together forming a belt sleeve. The cord application features are not used during the lamination step, so the cord applicator may be backed off or repositioned away from the mandrel. Preferably, the lamination heater applies heat to the carcass and produces surface melting of the top layer and profile layer. The process parameters of lamination speed and heat input should be adjusted such that only a thin skin of melting occurs on both surfaces without the material melting through and loosing its shape. The optimum heating and melting amount permits the top layer to fully bond to the carcass and cord, flowing around the portion of the cord not yet embedded, but not disturbing the pitch line and position of the cord. Nip pressure should be uniform and selected to prevent or eliminate all bubbles.

Figure 10:
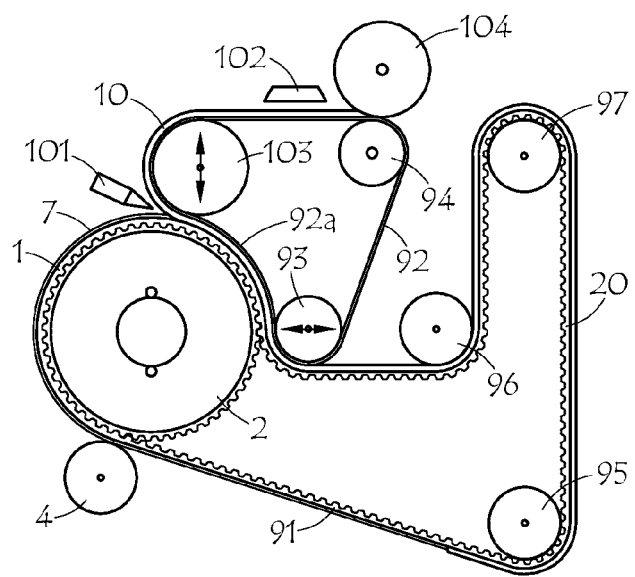
FIG. 10 is a schematic representation of a portion of a system according to another embodiment of the invention.

According to an embodiment of the invention, the laminator may include a pressure band which wraps around another portion of the wrap portion of the mandrel instead of the single pressure roll. The pressure band provides a longer time period of lamination pressure application than the nip, for a given mandrel speed. Lamination with a pressure band is illustrated in FIG. 10. Carcass 91 comprising profile layer and helically wrapped cord is trained over mandrel 2 where it is forcibly engaged by engagement roller 4. The free portion of the carcass is trained through the buffer section comprising guide rollers 95, 96 and 97. Pressure band 92 is trained around pressure roll 103, take off roll 93, and tensioning roll 94, thus wrapping around a portion of the mandrel at 92a. The pressure band may be of flexible steel construction. The pressure band system is movable or removable, as indicated by the arrows on rolls 103 and 93, so that is does not interfere with the cord winding step. It is advantageous to coat the mandrel with a non-stick coating to prevent belt materials from sticking to the band. Suitable non-stick coatings include, for example, fluoropolymers like polytetrafluoroethylene, silicone polymers, and the like. Top layer 10 may be let off a supply roll such as laminate supply roll 104 and fed into the nip between pressure roll 103 and mandrel 2. Heater 102 may be used to melt or soften the surface of the top layer material 10 so it will flow around the cord when it is pressed onto carcass 91 between pressure band 92a and mandrel 2. Numeral 101 indicates another useful location for a heater to also melt the surface of the profile layer in carcass 91.

According to another embodiment of the invention, also illustrated by FIG. 10, the numeral 101 may indicate a metering device for flowable lamination material instead of the sheet material supplied on roll 104. The metering device may be, for example, an extruder for thermoplastic materials such as TPE or TPU, or a gear pump for liquid curable resins such as silicone polymers, castable polyurethanes, or the like. The pressure band may then provide a cavity for shaping and forming the top layer of the belt using such materials. A heater may be provided near the wrap portion 92a of the pressure band. Thus, the cavity may be heated for curing a resin, or for curing a laminate of vulcanizable rubber material. The pressure band thus provides the curing temperature, pressure and residence time needed for curable belt materials. Thus, after one complete lamination circuit by the carcass, finished belt 20 is produced. The pressure band could have a surface texture or pattern in order to introduce a desired texture to the top layer, i.e. to the backside of the belt.

Figure 11:
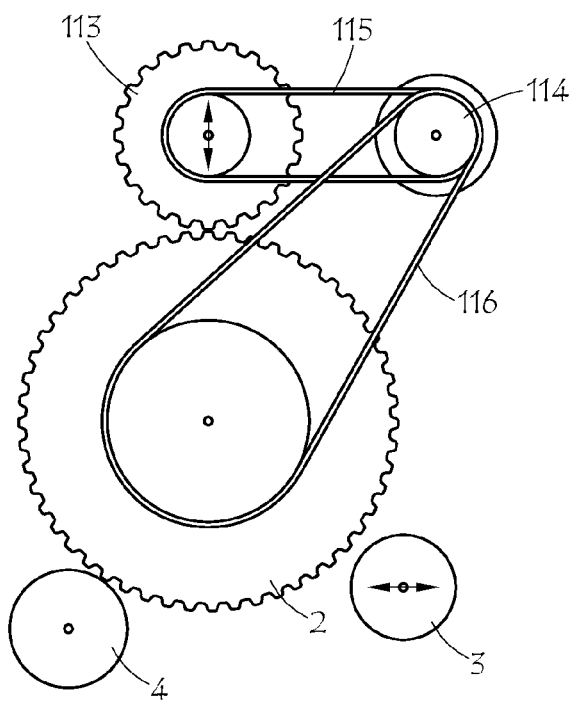
FIG. 11 is a schematic representation of a portion of a system according to another embodiment of the invention.

According to another embodiment of the invention, illustrated in FIG. 11, pressure roll 113 may be grooved in order to laminate a profiled top layer onto the carcass. The profiled top layer may be the same profile as that of the base layer (even the same profile material may be used), or different profiles may be used. Thus, double-sided toothed belts may be produced on the same equipment. It may be desirable to control the relative tooth alignment between the two sides of the belt. Mandrel 2 and pressure roll 13 may therefore advantageously be synchronized by means of a belt or chain drive system and/or gearing system or electronically. FIG. 11 illustrates one possible synchronization arrangement comprising reversing gear 114 driven by first belt 116 driven by mandrel 2, and driving pressure roll 113 with second belt 115. The synchronization goal may for example be to laminate the top layer and carcass at matching linear speeds, based on the cord pitch line. The illustrated drive in FIG. 11 approximately shows the pressure roll with about half the diameter of the mandrel and therefore with belt 116 on a 2:1 drive and belt 115 on a 1:1 drive to result in matching surface speeds for pressure roll 113 and mandrel 2. Other arrangements are possible depending on the desired end result. For example, the lamination roll in any of the embodiments could have a surface texture or pattern in order to introduce a desired texture to the top layer, i.e. to the backside of the belt.

According to another embodiment of the invention, the top layer may be cast directly onto the carcass without any external pressure (i.e., without a pressure band). Thus a liquid, fast-curing resin, may be applied to the carcass, in one or more rotations of the mandrel to build up the top layer. This method may result in thickness variations around the belt, for which a grinding or skiving operation may be advantageous for finishing the belt at a desired uniformity of thickness. In this casting option, edge flanges on the mandrel may be useful to prevent liquid resin from flowing off the mandrel before curing. Any suitable resin may be used provided suitable adhesion is achieved with the carcass. Foaming resins may be used to achieve a desired compressibility or softness of the top layer.

After manufacturing the belt sleeve, the same apparatus may be adapted and used to grind the surface of the backside or to otherwise machine the sleeve to provide a smooth or specific designed pattern on the back surface. Optionally or in addition, the back surface of the sleeve can be laminated with a fabric using the apparatus and method described for example to provide specific friction, wear or noise characteristics. Finally the sleeve may be printed or labeled and/or cut into the desired belt width while rotating on, installed on, or otherwise using, an embodiment of the same apparatus.

According to embodiments of the invention, a number of additional features or variations are possible. For example, to speed up the process, several cord winding heads can be arranged on slide 9 each a certain distant from the next, for example according to the desired width of the belt.

Figure 4:
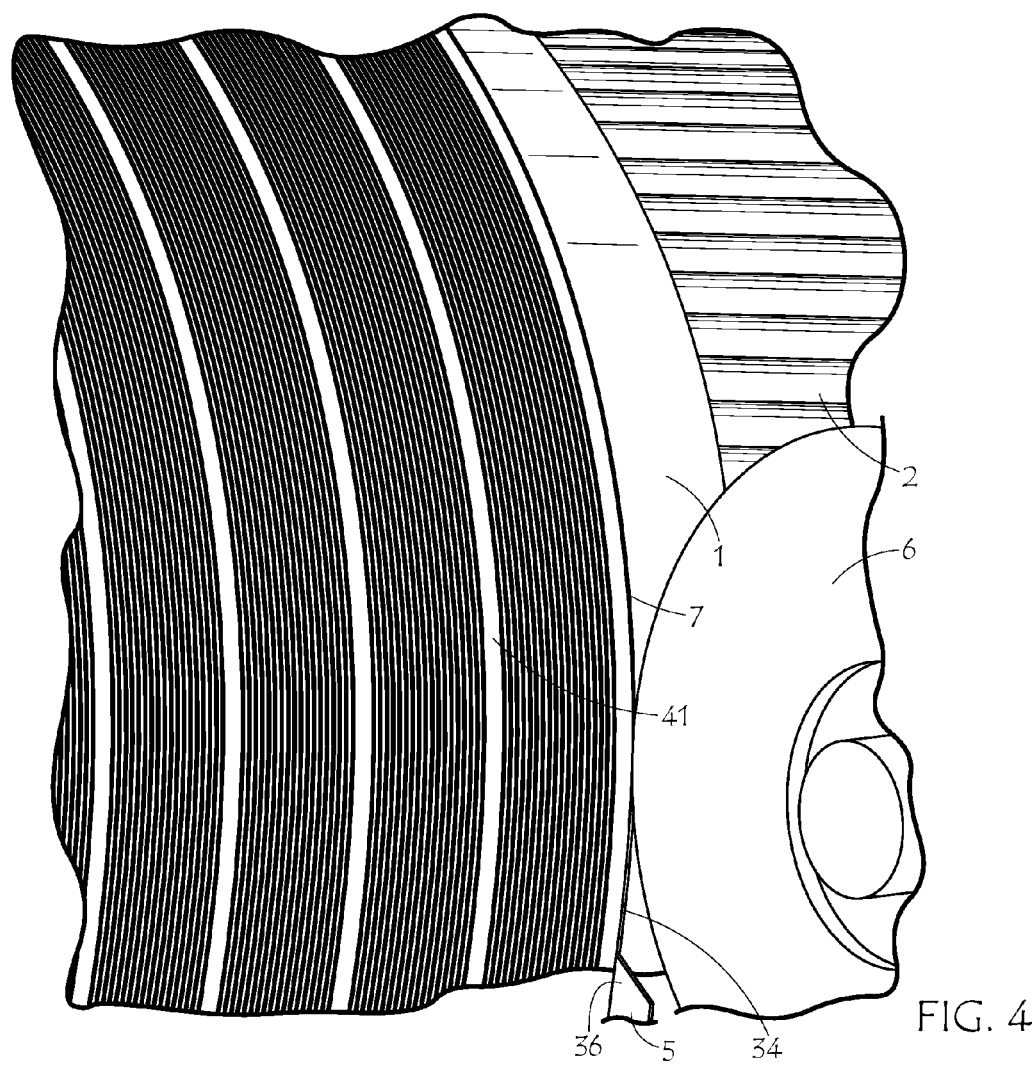
FIG. 4 is a partially fragmented perspective view of a portion of the system of FIG. 2.

The method and apparatus also allows one to spiral cord onto a carcass wide enough for multiple belts leaving a space free of tension member between each belt. This space facilitates the cutting of the belts, and results in belts with no cord exposed on the cut edge, i.e. no "edge cord." Alternatively the cord can be wound onto the carcass with continuous spaced cord or with a short section of cord jumping the space between belts. The cord may then be removed from the space where the belt width is to be cut. Removal of the cord between belts prior to laminating the top layer ensures that no edge cord is exposed on the cut edges. FIG. 4 illustrates an embodiment of the apparatus and method wherein a number of belts are to be cut from a single belt sleeve. FIG. 4 shows profile layer 1 in the wrap portion of mandrel 2 with cord 7 being applied near the end of the cord winding process step. Heated profile blade 36 is forming groove 34 just before cord 7 is laid therein. A number of gaps 41 in the tensile cord layer have been made corresponding to where the individual belts will be cut from the sleeve. The result after lamination and cutting will be belts with no exposed edge cord and no exposed cord due to flights. In other embodiments, different materials can be used on the profile (e.g., for enhancing noise or load performance) and on top side (e.g., for friction, appearance, profiling or the like). Likewise, textile or fabric can be used on the profile and/or on the backside. The backside can also be profiled instead of smooth. For example, the belt could then be a two-sided timing belt, or a timing/V-belt combination, or a multi-ribbed v-belt that is single- or double-sided. Alternately, the belt could be a flat belt, or have some other specific profile or profiles.

According to an embodiment of the invention, the cord applicator may include a pair of electrodes which may be rollers over which the cord moves, which supply sufficient current through the cord to heat the cord. In another embodiment, the cord applicator may supply two or more conductive cord ends over two or more pairs of electrodes which supply sufficient current through all the cords to heat the cords. The heat supplied may be enough to melt the profile layer and fuse the cords into the profile layer as the cords are brought into contact therewith. Conductive cords include steel cords, carbon fiber cords, and the like.

Suitable controls can be provided for automation of the inventive apparatus and method. For example, automatic control can be applied to engage, rotate and/or disengage various rollers such as the mandrel, guide rollers, laminating roller, cord guide roll and heating blade, cord/blade slide, and the like. Automatic control can be applied to control the temperature and/or energy input of the heating blade, the lamination heater and the like. Automatic control can be applied to various associated finishing processes such as grinding, machining, labeling, cutting, and the like. The control algorithms can be implemented in software and/or hardware. Manual intervention or manual operation can be provided for as desired. According to an embodiment of the invention, automatic counting of the number of teeth on the profile layer on the same apparatus can be implemented to facilitate forming of the endless profile layer. A tooth counter may be direct, e.g., using a mechanical, optical, or proximity sensor to detect teeth; or indirect, e.g., counting steps from a stepper motor and calculating tooth count therefrom. Joining the ends of the profile layer can be implemented on the same apparatus.

A number of additional advantages of the invention may be noted. By eliminating both flights and edge cord, the belt may be wholly sealed from the intended use environment as may be required for food service or other "clean belt" applications requiring cleaning, sterilization or the like. Also, the fully encapsuled tension member will be better protected against corrosion and bending, resulting in significant service life improvement. Thus, more expensive corrosion resistant steel wires may be replaced with more economical steel wire.

Separate manufacture of the profile material and the top layer material has a number of advantages over prior methods where everything was formed and assembled on the same apparatus. Separate manufacture allows profile and top layer materials to be made at optimum speeds for extrusion, generally much faster than possible when cord laying is done at the same time. Separate manufacture also permits much easier set up of the belt making system of FIG. 2, and for a much simpler design of that apparatus and lower capital cost. In particular, an extruder and a conventional molding pressure band and its associated drive system are not necessary. Set up times are significantly reduced and cord material utilization is improved as only one or two, or a relative few cords need to be threaded or installed rather than up to 100 and more cord ends on conventional open-ended belt-making equipment.

Dual cord winding (e.g., of both S and Z cord) is possible with this process, but is very difficult or rather impossible to do reproducibly in the known methods for long, endless belts as described above as the fourth prior art method. As mentioned earlier, multiple single or dual winding heads can be used (e.g., one head or set of heads for each belt width to be made simultaneously from a single belt sleeve). These possibilities would significantly speed up the process, further reducing the belt cost. Cord winding for endless belts can be the rate-limiting step in the manufacturing process. According to embodiments of the invention, the cord winding step can be carried out at linear winding speeds in the range of 5 to 50 meters per minute with suitable fusing of the cord to the carcass and suitable control of PLD.

The inventive method includes forcibly and snugly fitting the profile material onto the mandrel during winding by means of the engaging rolls 13 and 14 or suitable tension. In one embodiment, the teeth of the profile layer of the wrapping portion of the profile material are snug fit into the mating grooves of the mandrel in the wrapping portion. This snug fit, along with precision machining of the mandrel profile, and in conjunction with the control of the cord position, helps to insure consistent control of the pitch and pitch length of the resulting belt, also in the area of the profile layer join or splice. It is advantageous to make the endless profile layer initially a little shorter than the final belt length, to ensure the profile layer is stretched to hold the tight fit on the mandrel rather than compressed as it would be in the case where the profile layer is longer than the nominal pitch of the mandrel. It is the mandrel and the cord lay process that controls the ultimate belt pitch and pitch length for a toothed belt. Other known belt-making methods involving two mandrels involve greater risk that the belt pitch is not consistent, particularly in the join area.

By way of example, an embodiment of the apparatus was constructed having a mandrel about 400 mm wide and about 320 mm in diameter. Continuous profile material was produced off line, cut to length (in the land area) and the ends joined by using tape in the land or by ultrasonic welding. Tooth counting was automated by use of a stepper motor on the mandrel drive and associated step-counting software. Endless TPU toothed belts reinforced with steel, glass or aramid tensile cord and optionally with a nylon tooth covering fabric were made on the same mandrel with belt lengths ranging from about one meter to 30 meters in length. The mandrel could be rotated at least at two very different speeds: a high speed (selectable in the range of about 5 to 50 meter per minute) for winding cord onto the profile layer and a low speed (selectable in the range from 0.1 to 2 meters per minute) for laminating the top layer onto the reinforced carcass. The heated profile blade and the lamination heater were capable of brief, rapid heating using a temperature setting between 250 and 500° C. The blade temperature is such that the exposure time during contact between blade and profile material is sufficient to melt the surface just enough for the cord fusing operation. PLD variation was controlled within 30 microns.

Sample long-length endless toothed belts were tested against belts of similar profile and length made by other methods. Tensile strength was comparable for belts of the same type of tensile cord, as would be expected. Dynamic belt testing showed improvements in the inventive belts over the other belts, which were attributed to the improved pitch control resulting from the inventive process and apparatus.

The invention systems and methods described herein could also be used to make endless tracks for use in track drive systems for various types of track-driven vehicles, including without limitation, snowmobiles, snow cats, and other transportation vehicles, military vehicles, construction vehicles, robots, and the like. Examples of such an endless track are disclosed in U.S. Pat. No. 3,338,107 to Kiekhaifer, U.S. Pat. No. 8,033,619 to Bellemare, and U.S. Pat. No. 7,090,312 to Soucy et al., the contents of which are hereby incorporated herein by reference. The track may have a series of internal drive lugs, which may be formed and engaged on the mandrel in a way analogous to the teeth on a toothed belt, as described herein. Likewise, the track may have a series of external traction lugs, which may be formed in way analogous to the teeth on a dual toothed belt as also described herein. In other embodiments, the track may include a base belt formed with the invention systems and methods described herein after which internal and/or external lugs are fastened thereon.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A method of making an endless, reinforced, layered belt comprising;
   providing an endless profile layer having a circumference and having a belt profile on the inside side and having a top side;
   providing a supply of top layer material suitable for laminating to said top side of said profile layer;
   providing a supply of continuous, tensile cord suitable for helical winding around said profile layer and embedding between said profile layer and said top layer; and
   engaging a wrap portion of said profile layer on a portion of a rotatable cylindrical mandrel having a mandrel profile complementary to said belt profile and a circumference less than that of said profile layer by forcibly engaging said profile layer on said mandrel; and
   with a remaining free portion of the profile layer not engaged on said mandrel;
   wherein said engaging is induced by pressing said profile layer onto said mandrel with an engaging roller; and
   helically applying at a predetermined cord helical spacing said tensile cord to said profile layer with a cord applicator positioned adjacent said wrap portion of said mandrel so that said cord is firmly attached to said profile layer before disengagement of the resulting reinforced carcass portion from the wrap portion of the mandrel; and
   applying and attaching said top layer material to said reinforced carcass with a laminator positioned adjacent said wrap portion of said mandrel to cover said helical cord and complete said belt.

2. The method of claim 1 wherein the remaining free portion any of said profile layer, carcass and belt is disengaged from said mandrel with a take-off roller as said mandrel rotates.

3. The method of claim 1 further comprising:
   training the free portion of said profile layer about one or more guide rolls.

4. The method of claim 3 wherein said guide rolls comprise a plurality of rollers.

5. The method of claim 1 wherein said applying and attaching comprises:
   heating to melt at least a surface of said top layer; and
   pressing said top layer onto said carcass adjacent said wrap portion.

6. The method of claim 1 wherein said applying and attaching comprises:
   applying heat to one surface both of a sheet of the top layer and the carcass in the vicinity of a nip between a laminating roller and said mandrel; and
   pressing with said laminating roller at said nip to fuse together said top layer and said carcass within said wrap portion.

7. The method of claim 1 wherein said applying and attaching comprises applying adhesive to at least one surface of said top layer or carcass and pressing said top layer and carcass together.

8. The method of claim 1 wherein said providing an endless profile layer comprises forming a profile material in a separate continuous operation, cutting a predetermined length of so-formed continuous profile material, and joining the ends of said length of profile material to form said endless profile layer.

9. The method of claim 8 wherein said profile material and said top layer material are thermoplastic elastomers.

10. The method of claim 8 wherein said profile material and said top layer material are of the same composition.

11. The method of claim 8 wherein said profile material and said top layer material are of different compositions.

12. The method of claim 1 wherein said profile layer includes a plurality of belt teeth on one side, and said mandrel is grooved to engage with said teeth with a snug fit, whereby a toothed belt is formed.

13. The method of claim 1 further comprising at least one additional finishing step performed on the belt while installed on said mandrel and guides, said step selected from grinding, machining, labeling, and cutting.

14. A system for making an endless, reinforced, layered belt comprising;
   an endless profile layer having a circumference and having a belt profile on the inside side and having a top side;
   a supply of top layer material suitable for laminating to said top side of said profile layer;
   a supply of continuous, tensile cord suitable for helical winding around said profile layer and embedding between said profile layer and said top layer; and
   an apparatus comprising:
      a rotatable cylindrical mandrel having a mandrel profile complementary to said belt profile and a circumference less than that of said profile layer so that only a portion of said profile layer can be engaged with said mandrel at any time;
      a first engaging roller positioned adjacent said mandrel for pressing said profile layer onto said mandrel inducing wrapped engagement of said profile layer on a wrap portion of the mandrel during rotation of the mandrel;

a cord applicator positionable adjacent said mandrel to helically apply said tensile cord to said profile layer within said wrap portion at a predetermined cord helical spacing so that said cord is firmly attached to said profile layer before disengagement of the resulting reinforced carcass portion from the wrap portion of the mandrel; and a laminator positionable adjacent said mandrel to apply and attach said top layer material to said reinforced carcass within said wrap portion of the mandrel to cover said helically applied cord and complete said belt.

15. The system of claim 14 further comprising:

a take-off roller positioned adjacent said mandrel opposite said first engaging roller to disengage any of said profile layer from said wrap portion of the mandrel during rotation of the mandrel.

16. The system of claim 14 further comprising:

one or more guide rolls positioned remote from said mandrel about which the free portion of said endless profile layer is trained.

17. The system of claim 16 comprising a plurality of said guide rolls.

18. The system of claim 14 wherein said laminator comprises:

a laminating roller adjacent said wrap portion defining a nip between said mandrel and said laminating roller; and a laminate heater positioned to provide melting energy to at least one surface of one or both of a sheet of top layer material and the carcass.

19. The system of claim 14 wherein said cord applicator comprises:

a heated plow movably mounted adjacent said wrap portion for transverse movement in the axial direction with respect to said mandrel and for plowing a heated groove of predetermined depth in said profile layer; and a cord laying guide positioned to lay cord into said heated groove to fuse said cord to said profile layer, and said laying guide movably mounted for transverse movement in concert with said plow.

20. The system of claim 19 wherein said cord applicator presses said cord into but less than fully into said profile layer.

21. The system of claim 19 wherein said cord applicator comprises:

a dual cord laying guide for helically laying down two cords side by side; and wherein the profile blade is adapted to form two grooves for simultaneously laying and fusing said two cords onto said profile layer.

22. The system of claim 14 further comprising one or more additional cord applicators for simultaneously helically laying and fusing cord onto two or more axially spaced sections of the wrap portion.

23. The system of claim 14 further comprising a mandrel drive having at least two different speeds including a faster speed for cord winding with said cord applicator and a slower speed for laminating with said laminator.

24. The system of claim 14 wherein the belt is a toothed belt, the profile layer has a plurality of teeth, and the mandrel has grooves adapted to mate tightly with said teeth.

25. The system of claim 24 further comprising a tooth counter for determining the number of teeth in said endless profile layer.

26. The system of claim 24 wherein said mandrel circumference has at least one tooth less than the number of teeth in said belt profile.

27. The system of claim 24 wherein said endless profile layer comprises a join in a land section.

28. The system of claim 24 wherein said top layer has a tooth profile on one side and said belt is a two-sided toothed belt.

29. The system of claim 14 wherein said wrap portion occupies from more than 180 to about 315 degrees of the mandrel circumference.

30. The system of claim 14 wherein said cord applicator supplies two or more conductive cord ends over a pair of electrodes which supply sufficient current through the cords to heat the cords.

31. The system of claim 14 wherein said laminator comprises a pressure band trained around at least three pulleys and partially wrapping around said mandrel.

32. The system of claim 31 further comprising a metering device for flowing laminating material onto said carcass between said carcass on said mandrel and said pressure band.

33. The system of claim 14 wherein the belt is a track for a track vehicle drive system.

34. The system of claim 14 further comprising a second engaging roller positioned adjacent said mandrel opposite said first engaging roller, wherein said wrap portion of the mandrel is the portion on which said profile layer is wrapped and which is bounded by said first and second engaging rollers.

35. The system of claim 34 wherein said wrap portion occupies more than 180 degrees up to about 315 degrees of the mandrel circumference.

36. A system for making an endless, reinforced, layered belt comprising;

an endless profile layer having a circumference and having a belt profile on the inside side and having a top side;

a supply of top layer material suitable for laminating to said top side of said profile layer;

a supply of continuous, tensile cord suitable for helical winding around said profile layer and embedding between said profile layer and said top layer; and an apparatus comprising:

a rotatable cylindrical mandrel having a mandrel profile complementary to said belt profile and a circumference less than that of said profile layer so that only a portion of said profile layer can be engaged with said mandrel at any time;

a first engaging roller positioned adjacent said mandrel for pressing said profile layer onto said mandrel inducing wrapped engagement of said profile layer on a wrap portion of the mandrel during rotation of the mandrel; and a second engaging roller positioned adjacent said mandrel opposite said first engaging roller;

wherein said wrap portion of the mandrel is the portion on which said profile layer is wrapped and which is bounded by said first and second engaging rollers; and wherein said wrap portion occupies from about 270 to about 315 degrees of the mandrel circumference.

* * * * *